United States Patent
Appuswamy et al.

(10) Patent No.: US 10,019,667 B2
(45) Date of Patent: Jul. 10, 2018

(54) TRANSFORM FOR A NEUROSYNAPTIC CORE CIRCUIT

(71) Applicant: International Business Machines Corporation, Armonk, NY (US)

(72) Inventors: Rathinakumar Appuswamy, San Jose, CA (US); Myron D. Flickner, San Jose, CA (US); Dharmendra S. Modha, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 187 days.

(21) Appl. No.: 15/184,892

(22) Filed: Jun. 16, 2016

(65) Prior Publication Data

US 2017/0213125 A1    Jul. 27, 2017

Related U.S. Application Data

(63) Continuation of application No. 14/142,609, filed on Dec. 27, 2013, now Pat. No. 9,406,015.

(51) Int. Cl.
*G06N 3/04* (2006.01)
(52) U.S. Cl.
CPC ..................... *G06N 3/04* (2013.01)
(58) Field of Classification Search
CPC ......... G06N 3/04; G06N 3/063; G06N 99/005
See application file for complete search history.

(56) References Cited

U.S. PATENT DOCUMENTS

| | | | |
|---|---|---|---|
| 6,073,154 A | 6/2000 | Dick | |
| 8,234,431 B2 | 7/2012 | Kruglick | |
| 8,914,315 B2 | 12/2014 | Modha | |
| 8,990,130 B2 | 3/2015 | Alvarez-Icaza Rivera | |
| 8,990,616 B2 | 3/2015 | Alvarez-Icaza Rivera | |
| 8,996,430 B2 | 3/2015 | Modha | |
| 9,020,867 B2 | 4/2015 | Esser | |
| 9,053,429 B2 | 6/2015 | Alvarez-Icaza Rivera | |

(Continued)

FOREIGN PATENT DOCUMENTS

EP    2144174 A1    1/2010

OTHER PUBLICATIONS

Kimmel, M.J. et al., "Simultaneous Morphological Transforms of Interdependent Binary Images", IBM Technical Disclosure Bulletin, Nov. 1, 1990, pp. 340-343, vol. 33, No. 6B, IBM Corporation, USA.

(Continued)

*Primary Examiner* — Kyoung Lee
(74) *Attorney, Agent, or Firm* — Sherman IP LLP; Kenneth L. Sherman; Hemavathy Perumal

(57) ABSTRACT

Embodiments of the present invention provide a method for feature extraction comprising generating synaptic connectivity information for a neurosynaptic core circuit. The core circuit comprises one or more electronic neurons, one or more electronic axons, and an interconnect fabric including a plurality of synapse devices for interconnecting the neurons with the axons. The method further comprises initializing the interconnect fabric based on the synaptic connectivity information generated, and extracting a set of features from input received via the electronic axons. The set of features extracted comprises a set of features with reduced correlation.

20 Claims, 5 Drawing Sheets

(56) References Cited

U.S. PATENT DOCUMENTS

| | | | |
|---|---|---|---|
| 9,087,301 | B2 | 7/2015 | Alvarez-Icaza Rivera |
| 9,159,020 | B2 | 10/2015 | Alvarez-Icaza Rivera |
| 9,160,617 | B2 | 10/2015 | Alvarez-Icaza Rivera |
| 9,189,729 | B2 | 11/2015 | Arthur |
| 9,189,731 | B2 | 11/2015 | Modha |
| 9,195,903 | B2 | 11/2015 | Andreopoulos |
| 9,218,564 | B2 | 12/2015 | Arthur |
| 9,239,984 | B2 | 1/2016 | Arthur |
| 9,244,124 | B2 | 1/2016 | Alvarez-Icaza Rivera |
| 9,245,222 | B2 | 1/2016 | Modha |
| 9,245,223 | B2 | 1/2016 | Modha |
| 9,262,712 | B2 | 2/2016 | Modha |
| 9,269,044 | B2 | 2/2016 | Akopyan |
| 9,275,330 | B2 | 3/2016 | Esser |
| 9,292,788 | B2 | 3/2016 | Modha |
| 2011/0107060 | A1 | 5/2011 | McAllister et al. |
| 2013/0073497 | A1* | 3/2013 | Akopyan ............... G06N 3/049 706/27 |
| 2016/0155046 | A1 | 6/2016 | Appuswamy et al. |
| 2016/0292565 | A1 | 10/2016 | Appuswamy et al. |
| 2017/0068884 | A1 | 3/2017 | Appuswamy et al. |
| 2017/0228636 | A1 | 8/2017 | Appuswamy et al. |

OTHER PUBLICATIONS

Merolla, P. et al., "A Digital Neurosynaptic Core Using Embedded Crossbar Memory with 45pJ per Spike in 45nm", Proceedings of the 2011 IEEE Custom Integrated Circuits Conference (CICC), Sep. 19-21, 2011, pp. 1-4, IEEE, United States.

Arthur, J.V., et al., "Building Block of a Programmable Neuromorphic Substrate: A Digital Neurosynaptic Core", Proceedings of the 2012 International Joint Conference on Neural Networks (IJCNN), Jun. 10-15, 2012, pp. 1-8, IEEE, United States.

Imam, N. et al., "A Digital Neurosynaptic Core Using Event-Driven QDI Circuits", Proceedings of the 2012 IEEE 18th International Symposium on Asychronous Circuits and Systems, May 7-9, 2012, pp. 25-32, IEEE, United States.

Cassidy, A.S. et al., "Cognitive Computing Building Block: A Versatile and Efficient Digital Neuron Model for Neurosynaptic Cores", Proceedings of the 2013 International Joint Conference on Neural Networks (IJCNN), Aug. 4-9, 2013, pp. 1-10, IEEE, United States.

U.S. Notice of Allowance for U.S. Appl. No. 14/142,609 dated Apr. 4, 2016.

U.S. Notice of Allowance for U.S. Appl. No. 14/142,616 dated Apr. 11, 2016.

U.S. Non-Final Office Action for U.S. Appl. No. 15/184,917 dated Mar. 16, 2018.

U.S. Non-Final Office Action for U.S. Appl. No. 15/184,880 dated Mar. 16, 2018.

* cited by examiner

TRANSFORM FOR A NEUROSYNAPTIC CORE CIRCUIT

This invention was made with Government support under HR0011-09-C-0002 awarded by Defense Advanced Research Projects Agency (DARPA). The Government has certain rights in this invention.

BACKGROUND

The present invention relates to neuromorphic and synaptronic computation, and in particular, a transform for a neurosynaptic core circuit.

Neuromorphic and synaptronic computation, also referred to as artificial neural networks, are computational systems that permit electronic systems to essentially function in a manner analogous to that of biological brains. Neuromorphic and synaptronic computation do not generally utilize the traditional digital model of manipulating 0s and 1s. Instead, neuromorphic and synaptronic computation create connections between processing elements that are roughly functionally equivalent to neurons of a biological brain. Neuromorphic and synaptronic computation may comprise various electronic circuits that are modeled on biological neurons.

In biological systems, the point of contact between an axon of a neural module and a dendrite on another neuron is called a synapse, and with respect to the synapse, the two neurons are respectively called pre-synaptic and post-synaptic. The essence of our individual experiences is stored in conductance of the synapses. The synaptic conductance changes with time as a function of the relative spike times of pre-synaptic and post-synaptic neurons, as per spike-timing dependent plasticity (STDP). The STDP rule increases the conductance of a synapse if its post-synaptic neuron fires after its pre-synaptic neuron fires, and decreases the conductance of a synapse if the order of the two firings is reversed.

BRIEF SUMMARY

One embodiment provides a method for feature extraction. The method comprises generating synaptic connectivity information for a neurosynaptic core circuit. The core circuit comprises one or more electronic neurons, one or more electronic axons, and an interconnect fabric including a plurality of synapse devices for interconnecting the neurons with the axons. The method further comprises initializing the interconnect fabric based on the synaptic connectivity information generated, and extracting a set of features from input received via the electronic axons. The set of features extracted comprises a set of features with reduced correlation.

Another embodiment provides a method for reducing correlation between features. The method comprises generating synaptic connectivity information for a neurosynaptic core circuit. The core circuit comprises one or more electronic neurons, one or more electronic axons, and an interconnect fabric including a plurality of synapse devices for interconnecting the neurons with the axons. The method further comprises initializing the interconnect fabric based on the synaptic connectivity information generated, receiving multiple input features via the electronic axons, and generating a set of features with reduced correlation for the input features. The set of features is generated by combining the input features based on the synaptic connectivity information generated.

Another embodiment provides a neurosynaptic core circuit for feature extraction. The core circuit comprises one or more electronic neurons, one or more electronic axons for receiving input, and an interconnect fabric including a plurality of synapse devices for interconnecting the electronic neurons with the electronic axons. The interconnect fabric is initialized with synaptic connectivity information. The neurons generate output comprising a set of features with reduced correlation extracted from the input received based on the synaptic connectivity information.

Another embodiment provides a neurosynaptic core circuit for reducing correlation between features. The core circuit comprises one or more electronic neurons, one or more electronic axons for receiving multiple input features, and an interconnect fabric including a plurality of synapse devices for interconnecting the electronic neurons with the electronic axons. The interconnect fabric is initialized with synaptic connectivity information. The neurons generate a set of features with reduced correlation for the input features by combining the input features based on the synaptic connectivity information.

These and other features, aspects and advantages of the present invention will become understood with reference to the following description, appended claims and accompanying figures.

DETAILED DESCRIPTION

Figure 1:
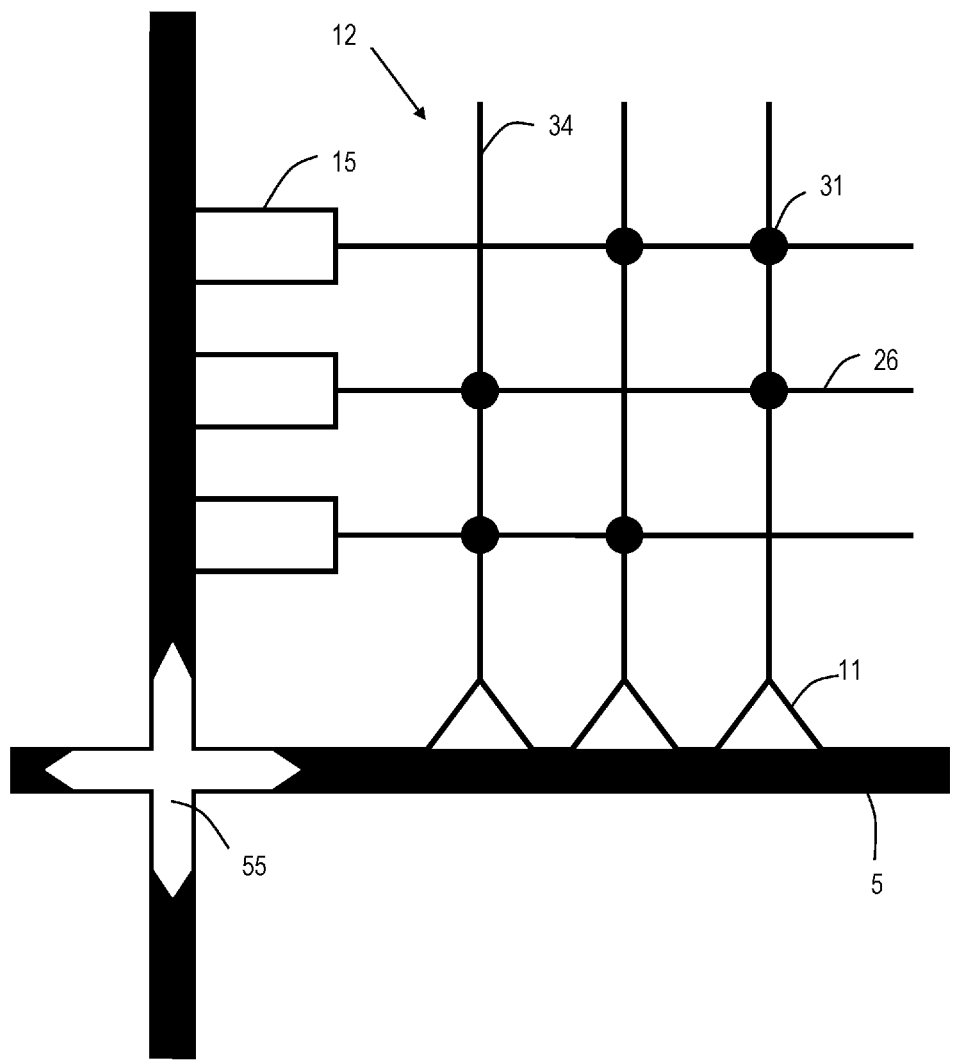
FIG. 1 illustrates an example neurosynaptic core circuit ("core circuit"), in accordance with embodiments of the invention.

Embodiments of the invention relate to neuromorphic and synaptronic computation, and in particular, a transform for a neurosynaptic core circuit. One embodiment provides a transform for a neurosynaptic core circuit configured for feature extraction. Based on the transform, the core circuit may extract a set of features with reduced correlation from input.

Another embodiment of the invention provides a transform for a neurosynaptic core circuit configured for reducing correlation between features. Based on the transform, the core circuit may generate a set of features with reduced correlation for multiple input features.

The term electronic neuron as used herein represents an architecture configured to simulate a biological neuron. An electronic neuron creates connections between processing elements that are roughly functionally equivalent to neurons of a biological brain. As such, a neuromorphic and synaptronic computation comprising electronic neurons according to embodiments of the invention may include various electronic circuits that are modeled on biological neurons. Further, a neuromorphic and synaptronic computation comprising electronic neurons according to embodiments of the invention may include various processing elements (including computer simulations) that are modeled on biological neurons. Although certain illustrative embodiments of the invention are described herein using electronic neurons comprising electronic circuits, the present invention is not limited to electronic circuits. A neuromorphic and synaptronic computation according to embodiments of the invention can be implemented as a neuromorphic and synaptronic architecture comprising circuitry, and additionally as a computer simulation. Indeed, embodiments of the invention can take the form of an entirely hardware embodiment, an entirely software embodiment or an embodiment containing both hardware and software elements.

The term electronic axon as used herein represents an architecture configured to simulate a biological axon that transmits information from one biological neuron to different biological neurons. In one embodiment, an electronic axon comprises a circuit architecture. An electronic axon is functionally equivalent to axons of a biological brain. As such, neuromorphic and synaptronic computation involving electronic axons according to embodiments of the invention may include various electronic circuits that are modeled on biological axons. Although certain illustrative embodiments of the invention are described herein using electronic axons comprising electronic circuits, the present invention is not limited to electronic circuits.

In one embodiment, a neuromorphic system comprises a system that implements neuron models, synaptic models, neural algorithms, and/or synaptic algorithms. In one embodiment, a neuromorphic system comprises software components and/or hardware components, such as digital hardware, analog hardware or a combination of analog and digital hardware (i.e., mixed-mode).

FIG. 1 illustrates an example neurosynaptic core circuit ("core circuit") 10, in accordance with an embodiment of the invention. The core circuit 10 comprises a plurality of electronic neurons 11 and a plurality of electronic axons 15. The neurons 11 and the axons 15 are interconnected via an x x y synaptic crossbar 12, wherein x and y are integers greater than or equal to one. The crossbar 12 comprises multiple electronic synapse devices ("synapses") 31, multiple rows/axon paths 26, and multiple columns/dendrite paths 34.

Each synapse 31 communicates neuronal firing events (e.g., spike events) between an axon 15 and a neuron 11. Specifically, each synapse 31 is located at cross-point junction between an axon path 26 and a dendrite path 34, such that a connection between the axon path 26 and the dendrite path 34 is made through said synapse 31. Each axon 15 is connected to an axon path 26, such that said axon 15 sends firing events to the connected axon path 26. Each neuron 11 is connected to a dendrite path 34, such that said neuron 11 receives firing events from the connected dendrite path 34.

In one embodiment, each neuron 11 receives input (e.g., incoming neuronal firing events, input data) via interconnected axons 15 and, in response to the input received, generates output (e.g., outgoing neuronal firing events) according to a neuronal activation function.

Each synapse 31 has a synaptic weight. The synaptic weights of the synapses 31 is represented by an xxy matrix W, wherein x and y are positive integers. A learning rule such as spike-timing dependent plasticity (STDP) may be applied to update the synaptic weights of the synapses 31.

In one embodiment, the synapses 31 are binary memory devices. For example, the synapses 31 are implemented using 1-bit static random-access memory (SRAM) cells. Each synapse 31 has a synaptic weight equal to "0" or "1".

In one embodiment, a synapse 31 with a synaptic weight "0" indicates that the synapse 31 is non-conducting. In another embodiment, a synapse 31 with a synaptic weight "0" indicates that the synapse 31 is not connected. In one embodiment, a synapse 31 with a synaptic weight "1" indicates that the synapse 31 is conducting. In another embodiment, a synapse 31 with a synaptic weight "1" indicates that the synapse 31 is connected. Although certain illustrative embodiments of the invention are described herein using synapses comprising electronic circuits, the present invention is not limited to electronic circuits.

In one embodiment, the axons 15 are implemented using complementary metal-oxide semiconductor (CMOS) logic gates that receive outgoing firing events generated by the neurons 11.

In one embodiment, the neurons 11 are implemented using complementary metal-oxide semiconductor (CMOS) logic gates that receive incoming firing events via interconnected axons 15, and generate outgoing firing events according to a neuronal activation function. In one embodiment, the neurons 11 include comparator circuits that generate outgoing firing events according to a neuronal activation function. The outgoing firing events are delivered to target axons 15, wherein the target axons 15 may reside in the same core circuit 10 or somewhere else in a larger system with many core circuits 10.

As shown in FIG. 1, the core circuit 10 has a corresponding router 55. The router 55 is an up-down-left-right mesh router configured to receive incoming address-event router packets targeting axons 15 of the core circuit 10. In one embodiment, each incoming address-event packet includes an incoming neuronal firing event encoded as an address (e.g., an address represented as bits) representing a target axon 15 of the core circuit 10. The axons 15 of the core circuit 10 receive incoming address-event packet from the router 55 via one or more communication paths/channels 5 (e.g., a bus). The router 55 is also configured to send outgoing address-event router packets generated by neurons 11 of the core circuit 10. In one embodiment, each outgoing address-event packet includes an outgoing neuronal firing event encoded as an address (e.g., an address represented as bits) representing a target axon 15 of the same core circuit 10 or a different core circuit 10. The neurons 11 of the core circuit 10 send outgoing address-event packet to the router 55 via one or more communication paths/channels 5 (e.g., a bus).

Figure 2:
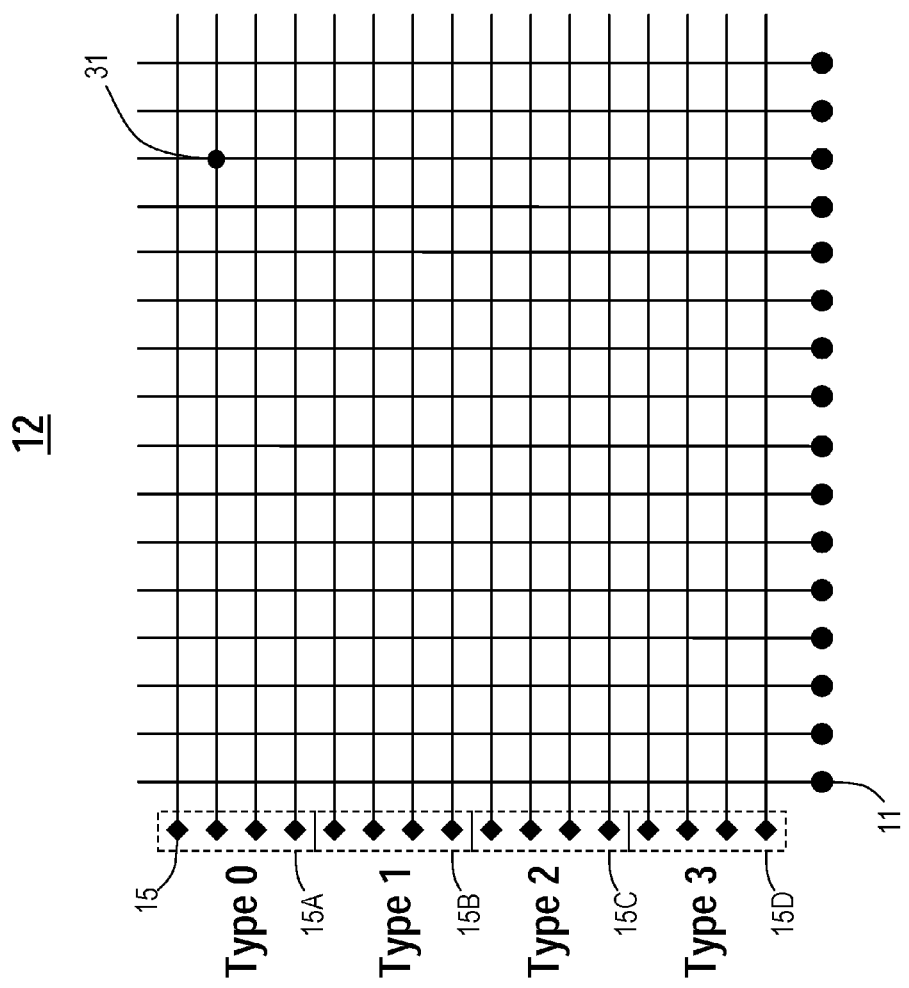
FIG. 2 illustrates a synaptic crossbar of a core circuit, in accordance with embodiments of the invention.

FIG. 2 illustrates a synaptic crossbar 12 of a core circuit 10 (FIG. 1), in accordance with an embodiment of the invention. The core circuit 10 receives input (e.g., input data) via the axons 15 of the core circuit 10. In one embodiment, each axon 15 has a corresponding axon type T. For example, the axon type T may be one of the following: axon type Type 0, axon type Type 1, axon type Type 2, and axon type Type 3. Let $T_j$ denote an axon type of $j^{th}$ axon 15 of the crossbar 12.

As shown in FIG. 2, the axons 15 of the core circuit 10 include a first axon group 15A comprising at least one axon 15 having axon type Type 0, a second axon group 15B comprising at least one axon 15 having axon type Type 1, a third axon group 15C comprising at least one axon 15 having axon type Type 2, and a fourth axon group 15D comprising at least one axon 15 having axon type Type 3.

The synaptic strength (i.e., connection strength) between a neuron 11 and an axon 15 may be modulated. Each neuron 11 has a corresponding effective synaptic strength for each axon type T. Let $S_{i,Tj}$ denote an effective synaptic strength between an $i^{th}$ neuron 11 of the crossbar 12 and a $j^{th}$ axon 15 having an axon type $T_j$. Let $W_{ij}$ represent a synaptic weight of a synapse 31 between the $i^{th}$ neuron 11 and the $j^{th}$ axon 15. When the $i^{th}$ neuron 11 receives input (e.g., an incoming neuronal firing event) from the $j^{th}$ axon 15, a membrane potential variable V of the $i^{th}$ neuron 11 is adjusted based on the effective synaptic strength $S_{i,Tj}$ and the synaptic weight $W_{ij}$.

Feature extraction is essential to efficiently process, learn and associate high-dimensional data. One embodiment of the invention provides a transform for signal processing in a core circuit 10. The transform as described herein initializes synaptic connectivity information (e.g., synaptic weights and effective synaptic strengths) for a core circuit 10. The transform also reduces average correlation for feature extraction utilizing the core circuit 10, thereby enabling the extraction of a set of features with reduced correlation.

Figure 3:
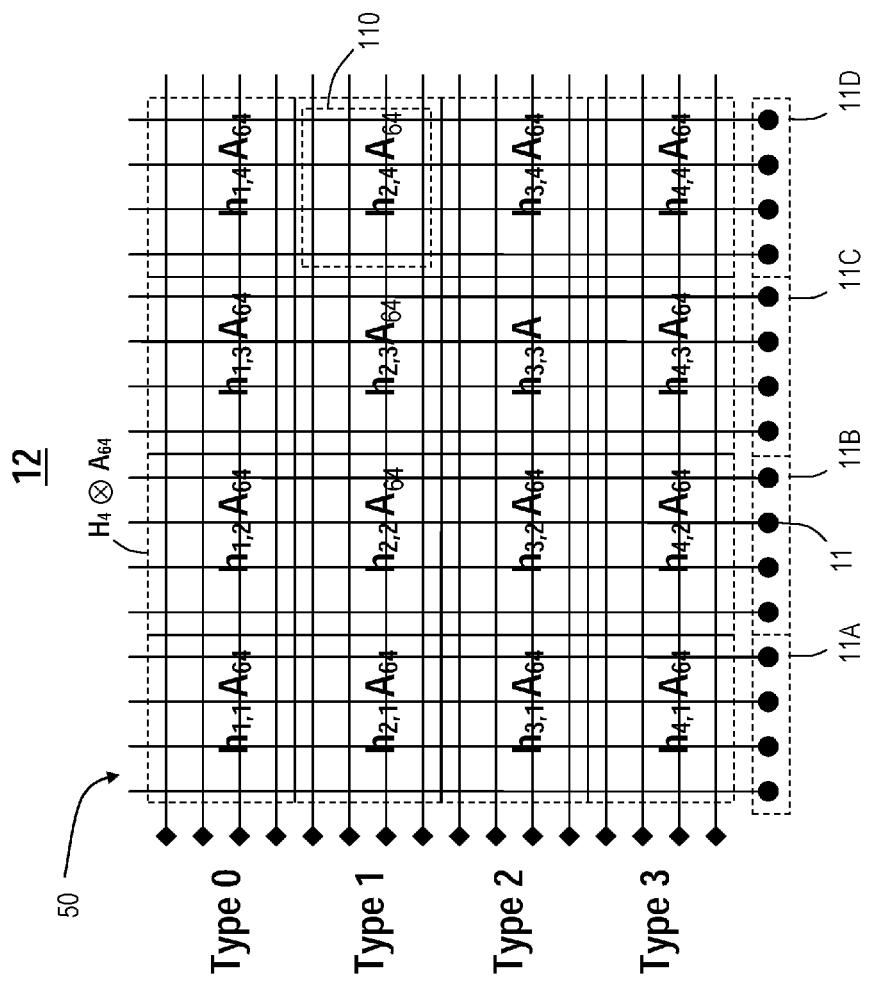
FIG. 3 illustrates a transform for a single core circuit, in accordance with an embodiment of the invention.

FIG. 3 illustrates a transform 50 for a single core circuit 10, in accordance with an embodiment of the invention. In one embodiment, the crossbar 12 for a core circuit 10 is implemented (i.e., constructed) based on a single-core transform. Specifically, a single-core transform may be used to initialize synaptic connectivity information for the core circuit 10, such as synaptic weights and effective synaptic strengths. A single-core transform is defined as a Kronecker product H ⊗ A, wherein H is a Hadamard matrix, and wherein A is a binary matrix. A Hadamard matrix H is an orthogonal matrix with particular entries that are either +1 or −1. A Hadamard matrix has maximal determinant among matrices with entries of absolute value less than or equal to 1.

Let q represent the probability that an entry of the matrix A is 1. In one embodiment, the matrix A is random binary matrix comprising entries that are independent and binomially distributed. In another embodiment, the matrix A is learned based on the distribution of input received by the core circuit 10 using one or more machine learning techniques.

For example, a 256×256 crossbar 12 may be implemented using a single-core transform 50. The single-core transform 50 is defined as a Kronecker product $H_4$ ⊗ $A_{64}$, wherein $H_4$ is a 4×4 Hadamard matrix, and wherein $A_{64}$ is a 64×64 random binary matrix where the probability of 1 is q. Computing the Kronecker product $H_4$ ⊗ $A_{64}$ generates a 256×256 matrix. A 256×256 crossbar 12 for a core circuit 10 may be based on the Kronecker product $H_4$ ⊗ $A_{64}$ computed.

The matrix $A_{64}$ represents random synaptic weights. The single-core transform 50 initializes/sets the synaptic weights of the synapses 31 of the crossbar 12.

The Hadamard matrix $H_4$ represents effective synaptic strengths for different axon types. Each neuron 11 has a corresponding effective synaptic strength for each axon type T. For each neuron 11, the single-core transform 50 initializes/sets for the neuron 11 an effective synaptic strength for each axon type T.

For example, the neurons 11 of the core circuit 10 may include a first neuron group 11A comprising at least one neuron 11, a second neuron group 11B comprising at least one neuron 11, a third neuron group 11C comprising at least one neuron 11, and a fourth neuron group 11D comprising at least one neuron 11. Each entry h of the Hadamard matrix $H_4$ is a scalar number that defines/sets an effective synaptic strength for at least one neuron 11 for an axon type T.

Specifically, as shown in FIG. 3, $h_{1,1}$, $h_{1,2}$, $h_{1,3}$ and $h_{1,4}$ represent an effective synaptic strength for neurons 11 of the first neuron group 11A, the second neuron group 11B, the third neuron group 11C and the fourth neuron group 11D, respectively, for the axon type Type 0. $h_{2,1}$, $h_{2,2}$, $h_{2,3}$ and $h_{2,4}$ represent an effective synaptic strength for neurons 11 of the first neuron group 11A, the second neuron group 11B, the third neuron group 11C and the fourth neuron group 11D, respectively, for the axon type Type 1. $h_{3,1}$, $h_{3,2}$, $h_{3,3}$ and $h_{3,4}$ represent an effective synaptic strength for neurons 11 of the first neuron group 11A, the second neuron group 11B, the third neuron group 11C and the fourth neuron group 11D, respectively, for the axon type Type 2. $h_{4,1}$, $h_{4,2}$, $h_{4,3}$ and $h_{4,4}$ represent an effective synaptic strength for neurons 11 of the first neuron group 11A, the second neuron group 11B, the third neuron group 11C and the fourth neuron group 11D, respectively, for the axon type Type 3.

As shown in FIG. 3, the Kronecker product $H_4$ ⊗ $A_{64}$ comprises multiple smaller square matrices 110, such as matrices $h_{1,1}A_{64}$, $h_{1,2}A_{64}$, $h_{1,3}A_{64}$, $h_{1,4}A_{64}$, $h_{2,1}A_{64}$, ..., and $h_{4,4}A_{64}$. Each entry of each matrix 110 represents a value that is be combined into a membrane potential variable V of a neuron 11 when the neuron 11 receives input from an axon 15 having axon type T.

Specifically, each entry of each matrix $h_{1,1}A_{64}$, $h_{1,2}A_{64}$, $h_{1,3}A_{64}$ and $h_{1,4}A_{64}$ represents a value that is combined into a membrane potential variable V of a neuron 11 for the axon type Type 0. For example, each entry of the matrix $h_{1,1}A_{64}$ represents a value that is combined into a membrane potential variable V of a neuron 11 of the first neuron group 11A when the neuron 11 receives input from an axon 15 having axon type Type 0. Each entry of each matrix $h_{2,1}A_{64}$, $h_{2,2}A_{64}$, $h_{2,3}A_{64}$ and $h_{2,4}A_{64}$ represents a value that is combined into a membrane potential variable V of a neuron 11 for the axon type Type 1. Each entry of each matrix $h_{3,1}A_{64}$, $h_{3,2}A_{64}$, $h_{3,3}A_{64}$ and $h_{3,4}A_{64}$ represents a value that is combined into a membrane potential variable V of a neuron 11 for the axon type Type 2. Each entry of each matrix $h_{4,1}A_{64}$, $h_{4,2}A_{64}$, $h_{4,3}A_{64}$ and $h_{4,4}A_{64}$ represents a value that is combined into a membrane potential variable V of a neuron 11 for the axon type Type 3.

A neuron 11 generates output (e.g., an outgoing neuronal firing event) when a membrane potential variable V of the neuron 11 reaches a pre-determined threshold value Th. Output (e.g., outgoing neuronal firing events, a set of features) generated by the neurons 11 of the core circuit 10 may be provided to classifiers.

As stated above, a single-core transform for a single core circuit 10 is defined as a Kronecker product H ⊗ A, wherein H is a Hadamard matrix, and wherein A is a binary matrix. In one embodiment, the single-core transform enables the core circuit 10 to extract a set of features with reduced correlation from input during feature extraction. In one example implementation, the single-core transform enables the core circuit 10 to extract a maximally uncorrelated set of features with reduced correlation from input during feature extraction, thereby minimizing average correlation for feature extraction. For example, the average correlation for an extracted set of features is $q^2/4$, wherein q is the probability of 1 for the matrix A of the single-core transform.

In another embodiment, the single-core transform enables the core circuit 10 to reduce correlation between multiple input features by generating set of features with reduced correlation for the input features. In one example implementation, the core circuit 10 generates a decorrelated set of features for the input features.

As stated above, a Hadamard matrix H is an orthogonal matrix with particular entries that are either +1 or −1. In another embodiment, an orthogonal matrix other than a Hadamard matrix H may be used instead to define the single-core transform. For example, a 4×4 orthogonal matrix $O_4$, as represented in form (1) provided below, may be used in lieu of a 4×4 Hadamard matrix $H_4$:

$$O_4 = \begin{pmatrix} a & b & c & d \\ -b & a & -d & c \\ -c & d & a & -b \\ -d & -c & b & a \end{pmatrix}, \quad (1)$$

wherein a, b, c and d are integers between −255 and +255.

As another example, a Cayley transform may be applied to a skew symmetric matrix S to generate an orthogonal matrix Q, wherein the orthogonal matrix Q may be used in lieu of a Hadamard matrix H to define the single-core transform. The Cayley transform produces the orthogonal matrix Q using the equation (2) provided below:

$$Q = (I-S)(I+S)^{-1} \quad (2),$$

wherein I represent an identity matrix (i.e., a square matrix with ones on the main diagonal and zeros elsewhere). For example, the Cayley transform may be applied to an example 4×4 skew symmetric matrix $S_4$, as represented in form (3) provided below, to generate a 4×4 orthogonal matrix $Q_4$ that may be used in lieu of a 4×4 Hadamard matrix $H_4$:

$$S_4 = \begin{pmatrix} 0 & a & b & c \\ -a & 0 & d & e \\ -b & -d & 0 & f \\ -c & -e & -f & 0 \end{pmatrix}. \quad (3)$$

If the orthogonal matrix Q is a rational-valued orthogonal matrix, the orthogonal matrix Q may be normalized to obtain an integer-valued orthogonal matrix.

A crossbar 12 implemented using the single-core transform may be mapped to hardware.

In one embodiment, an external environment supplies input to the axons 15 of the core circuit 10. For example, external sensors may capture and supply sensory inputs (e.g., raw image data, raw audio data, or other examples of sensor data) to the axons 15.

The term feature as used herein characterizes a distinct property of the input received via the axons 15 of the core circuit 10. For example, if the input received comprises image data, possible features corresponding to the image data may include features relating to the color, texture and shape of the image data.

Figure 4:
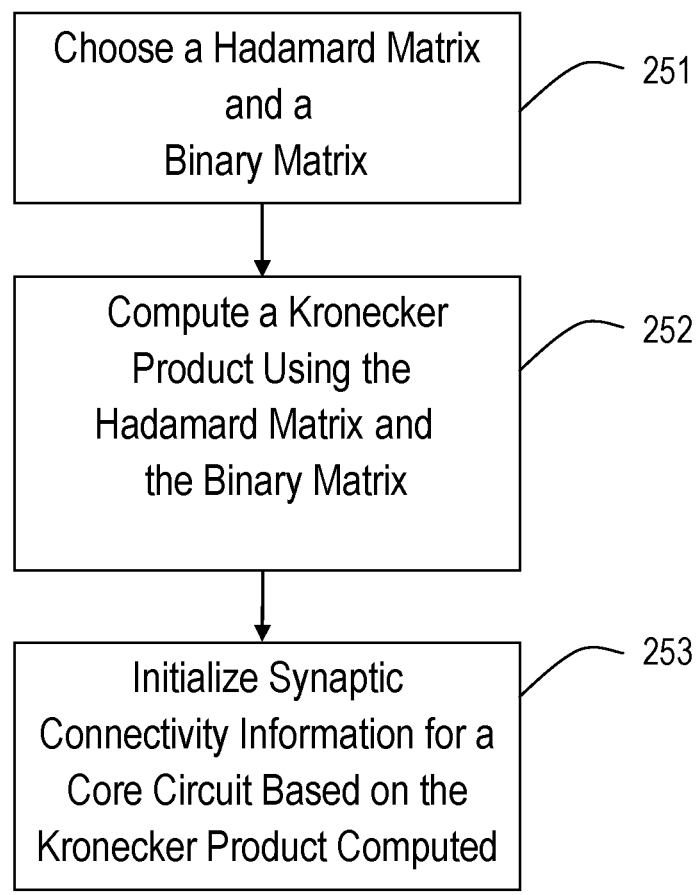
FIG. 4 illustrates a flowchart of an example process for feature extraction in a single core circuit, in accordance with an embodiment of the invention.

FIG. 4 illustrates a flowchart of an example process 250 for feature extraction in a single core circuit, in accordance with an embodiment of the invention. In process block 251, choose a Hadamard matrix and a binary matrix. In process block 252, compute a Kronecker product using the Hadamard matrix and the binary matrix. In process block 253, initialize synaptic connectivity information for the core circuit based on the Kronecker product computed. In one embodiment, configuring the core circuit with the synaptic connectivity information enables the core circuit to extract a set of features with reduced correlation from input during feature extraction. In another embodiment, configuring the core circuit with the synaptic connectivity information enables the core circuit to generate a set of features with reduced correlation for multiple input features by combining the input features based on the synaptic connectivity information.

Figure 5:
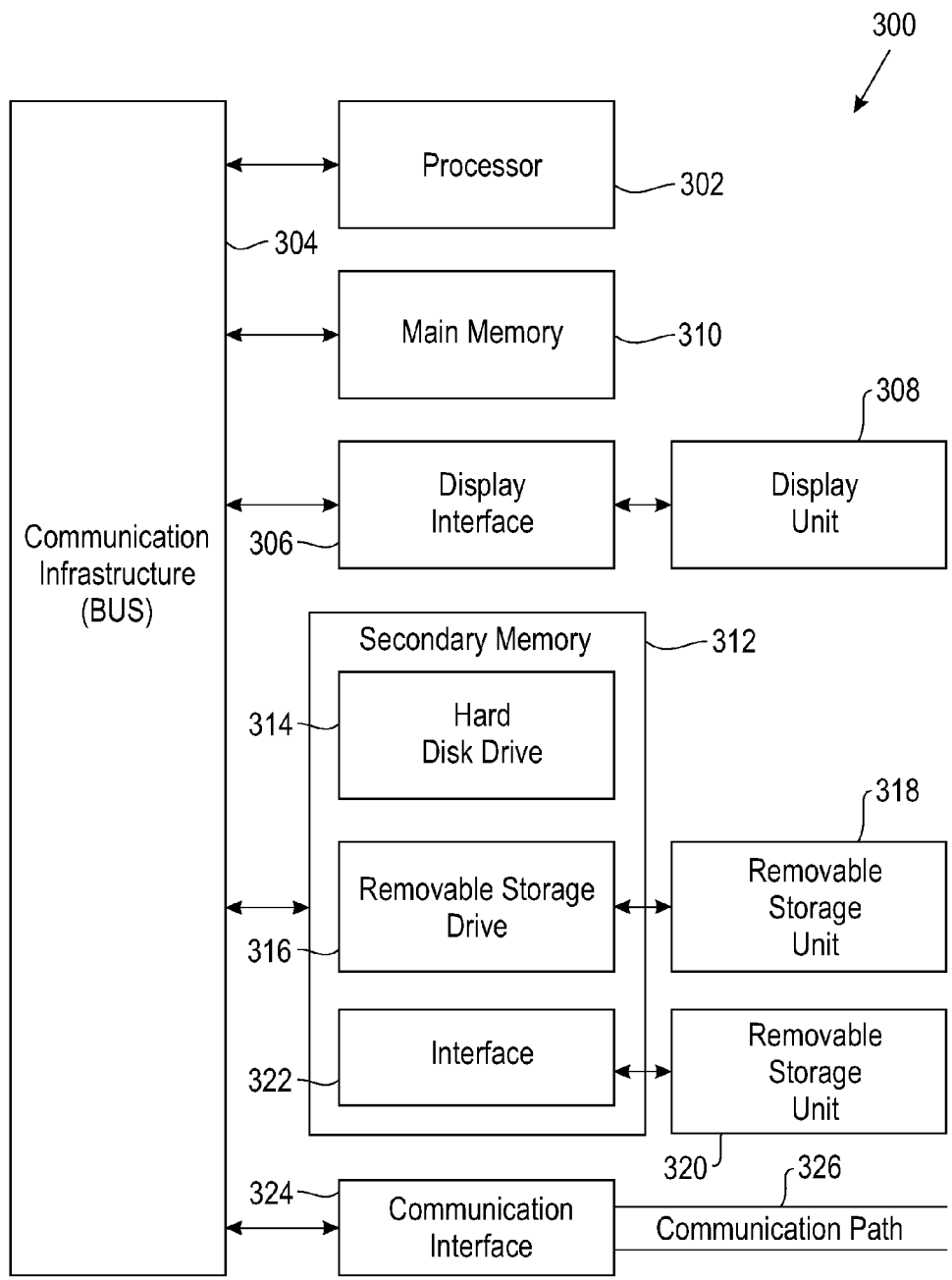
FIG. 5 is a high level block diagram showing an information processing system useful for implementing one embodiment of the present invention.

FIG. 5 is a high level block diagram showing an information processing system 300 useful for implementing one embodiment of the present invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322 which allow software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

From the above description, it can be seen that the present invention provides a system, computer program product, and method for implementing the embodiments of the invention. The present invention further provides a non-transitory computer-useable storage medium for hierarchical routing and two-way information flow with structural plasticity in neural networks. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   selecting a first matrix and a second matrix;
   computing a product based on the first matrix and the second matrix;
   initializing a core circuit for feature extraction based on the product, wherein the core circuit comprises a plurality of synapses interconnecting a plurality of axons to a plurality of neurons;
   receiving, at the core circuit, a plurality of input features; and
   reducing correlation between the plurality of input features by generating, via the core circuit, a decorrelated set of features for the plurality of input features.

2. The method of claim 1, wherein the first matrix is an orthogonal matrix, and the second matrix is a binary matrix.

3. The method of claim 2, wherein the computing comprises computing a Kronecker product between the first matrix and the second matrix.

4. The method of claim 2, wherein the binary matrix is a random binary matrix comprising entries that are independent and binomially distributed.

5. The method of claim 2, wherein the binary matrix is learned based on a distribution of input received by the core circuit.

6. The method of claim 1, wherein the initializing comprises:
   initializing synaptic weights for the plurality of synapses; and
   initializing effective synaptic strengths for the plurality of axons.

7. The method of claim 6, wherein the reducing correlation further comprises:
   combining the plurality of input features based on the synaptic weights and the effective synaptic strengths.

8. A system comprising a computer processor, a computer-readable hardware storage medium, and program code embodied with the computer-readable hardware storage medium for execution by the computer processor to implement a method comprising:
   selecting a first matrix and a second matrix;
   computing a product based on the first matrix and the second matrix;
   initializing a core circuit for feature extraction based on the product, wherein the core circuit comprises a plurality of synapses interconnecting a plurality of axons to a plurality of neurons;
   receiving, at the core circuit, a plurality of input features; and
   reducing correlation between the plurality of input features by generating, via the core circuit, a decorrelated set of features for the plurality of input features.

9. The system of claim 8, wherein the first matrix is an orthogonal matrix, and the second matrix is a binary matrix.

10. The system of claim 9, wherein the computing comprises computing a Kronecker product between the first matrix and the second matrix.

11. The system of claim 9, wherein the binary matrix is a random binary matrix comprising entries that are independent and binomially distributed.

12. The system of claim 9, wherein the binary matrix is learned based on a distribution of input received by the core circuit.

13. The system of claim 8, wherein the initializing comprises:
   initializing synaptic weights for the plurality of synapses; and
   initializing effective synaptic strengths for the plurality of axons.

14. The system of claim 13, wherein the reducing correlation further comprises:
   combining the plurality of input features based on the synaptic weights and the effective synaptic strengths.

15. A computer program product comprising a computer-readable hardware storage medium having program code embodied therewith, the program code being executable by a computer to implement a method comprising:
   selecting a first matrix and a second matrix;
   computing a product based on the first matrix and the second matrix;

initializing a core circuit for feature extraction based on the product, wherein the core circuit comprises a plurality of synapses interconnecting a plurality of axons to a plurality of neurons;

receiving, at the core circuit, a plurality of input features; and reducing correlation between the plurality of input features by generating, via the core circuit, a decorrelated set of features for the plurality of input features.

16. The computer program product of claim 15, wherein the first matrix is an orthogonal matrix, and the second matrix is a binary matrix.

17. The computer program product of claim 16, wherein the computing comprises computing a Kronecker product between the first matrix and the second matrix.

18. The computer program product of claim 16, wherein the binary matrix is a random binary matrix comprising entries that are independent and binomially distributed.

19. The computer program product of claim 16, wherein the binary matrix is learned based on a distribution of input received by the core circuit.

20. The computer program product of claim 15, wherein:
the initializing comprises:
  initializing synaptic weights for the plurality of synapses; and
  initializing effective synaptic strengths for the plurality of axons; and
the reducing correlation further comprises:
  combining the plurality of input features based on the synaptic weights and the effective synaptic strengths.

* * * * *